Sept. 26, 1950 L. GROSS 2,523,365

TESTING SYSTEM FOR CATHODE-RAY TELEPHONE SWITCHING APPARATUS

Filed May 10, 1948 7 Sheets-Sheet 1

INVENTOR
L. GROSS
BY John A. Hall
ATTORNEY

Sept. 26, 1950 L. GROSS 2,523,365

TESTING SYSTEM FOR CATHODE-RAY TELEPHONE SWITCHING APPARATUS

Filed May 10, 1948 7 Sheets-Sheet 2

INVENTOR
L. GROSS
BY John A. Hall
ATTORNEY

Sept. 26, 1950 L. GROSS 2,523,365

TESTING SYSTEM FOR CATHODE-RAY TELEPHONE SWITCHING APPARATUS

Filed May 10, 1948 7 Sheets-Sheet 3

INVENTOR
L. GROSS
BY
ATTORNEY

INVENTOR
L. GROSS
BY John A. Hall
ATTORNEY

INVENTOR
L. GROSS
BY John A. Hall
ATTORNEY

Sept. 26, 1950

L. GROSS 2,523,365

TESTING SYSTEM FOR CATHODE-RAY TELEPHONE SWITCHING APPARATUS

Filed May 10, 1948

7 Sheets-Sheet 6

INVENTOR
L. GROSS
BY John A. Hall
ATTORNEY

INVENTOR
L. GROSS
BY John A. Hall
ATTORNEY

Patented Sept. 26, 1950

2,523,365

UNITED STATES PATENT OFFICE 2,523,365

TESTING SYSTEM FOR CATHODE-RAY TELEPHONE SWITCHING APPARATUS

Leo Gross, Bayside, N. Y., assignor to Bell Telephone Laboratories, Incorporated, New York, N. Y., a corporation of New York Application May 10, 1948, Serial No. 26,179

8 Claims. (Cl. 179—18)

This invention relates to testing systems and particularly to electronic means for determining the idle or busy condition of a selected line in a telecommunication switching system.

The object of the invention is to provide a rapid and reliable busy test means in an ultra-high speed switching system. The conventional methods used in machine switching systems are wholly inadequate in certain newly projected electronic switching systems due to the speed at which the switching is accomplished in such new systems. The busy test means which must be provided to perform similar functions to those in conventional systems must be capable of operating at speeds commensurate with the speed of the switching attained in these newly devised systems.

The invention consists of the combination of a number of elements. First, a cathode-ray device is provided by means of which a beam may be directed selectively toward a called line appearance. The cathode-ray device is provided with a plurality of dynodes, an element neither an anode nor a cathode (since it does not participate in the control of the tube) to which the beam may be directed. Such dynode is connected to a subscriber line and is capable of being conditioned electrically to indicate that the line is either busy or idle. The cathode-ray device also has a secondary emission collector grid which is affected differently when a dynode is encountered by the cathode-ray beam when the line is busy or when it is idle.

Secondly, there is provided a common apparatus (also electronic) known as a register which may be set to any given index such as a called line number and which will, therefore, point out, mark or otherwise direct some other given piece of apparatus to the line or location defined by such index. In the present case, the register is used to direct the beam of the cathode-ray tube to the dynode individual to the called line whose number is used as the setting index.

Third, there is a test circuit connected to the secondary emission collector grid of the cathode tube for detecting and reporting the idle or busy condition of a called line. This circuit consists essentially of a pair of electron tubes to which a pulse may be transmitted when the cathode-ray beam is directed to the dynode of the called line. One tube will respond to a pulse transmitted thereto when either a busy or idle line is encountered but this tube is rendered slow to respond. The other tube will only respond to a pulse of over a given magnitude and the two tubes are in a mutually controlled circuit so that when one responds the other is then locked out and prevented from responding. Hence, if a strong pulse is transmitted to this circuit the second of said tubes will respond and lock out the first and by this operation will create and transmit a signal indicating that the tested line is idle. If, on the other hand, a weak pulse is transmitted to this circuit the second tube will fail to respond whereupon after a time (a very small fraction of a second) the first will respond and thereupon lock out the second of these tubes and by this operation will create and transmit a signal indicating that the tested line is busy.

As an alternative arrangement but a single tube may be used to respond to the condition created in the secondary emission collector grid of the cathode-ray tube when a busy line is encountered. This tube will, therefore, respond only to a busy test and not to an idle test so that if this tube responds a circuit change is made to transmit a busy signal to the calling line, otherwise the normal means for establishing a connection to the called line will be allowed to continue its operation uninterruptedly.

This control circuit is disclosed in a beam switching system which is extremely fast in operation. While this invention may be used in any sort of a switching system, its operation is disclosed in connection with a light beam switching system in which a two-way light beam signalling path is included as a link in the connection between a calling and a called line.

A feature of the invention is an electron tube circuit for differentiating between two different conditions and for establishing and transmitting signals identifying the particular condition detected.

Another feature of the invention is a circuit for differentiating between two different conditions consisting of a pair of electron tubes in a mutually controlling circuit whereby either tube becoming operated locks out and prevents the other from operating, one of said tubes being responsive to both weak and strong pulses but being slow to operate and the other of said tubes being responsive only to strong pulses and being fast to operate.

Another feature of the invention is a circuit consisting of a pair of cold cathode tubes in a mutually controlling circuit for testing the idle or busy condition of a line to which the circuit of these tubes may be temporarily connected.

Another feature of the invention is an electron tube circuit operated through a secondary emission collector grid path of a cathode-ray tube for detecting and reporting the busy condition of a line to which the cathode-ray of said cathode-ray tube may be directed.

Another feature of the invention is a cathode-ray number group device comprising a plurality of cathode-ray tubes each having a plurality of dynodes leading to outgoing control circuits. The so-called number group device is one which responds to an index such, for instance, as the number of a called line in an intercommunication system and which will selectively affect a plurality of outgoing control circuits to point out, mark or otherwise identify a called line or a path toward a called line. In the present case, the beam directing means of these cathode-ray tubes are controlled by the index specified or signalled by a calling line and will respond by electrically characterizing control circuits leading to the path establishing means. Such path establishing means may be electronic in character such as the idle or busy test means herein disclosed in which another cathode-ray tube is used for directing a beam at a dynode individual to a called line.

Another feature of the invention is a beam switching system in which the interconnection of lines, either subscribers' lines or interoffice trunks, is accomplished by way of beams, particularly and by way of example, light beams.

Other features will appear hereinafter.

The drawings consist of seven sheets having eight figures as follows.

Figures 1, 8:
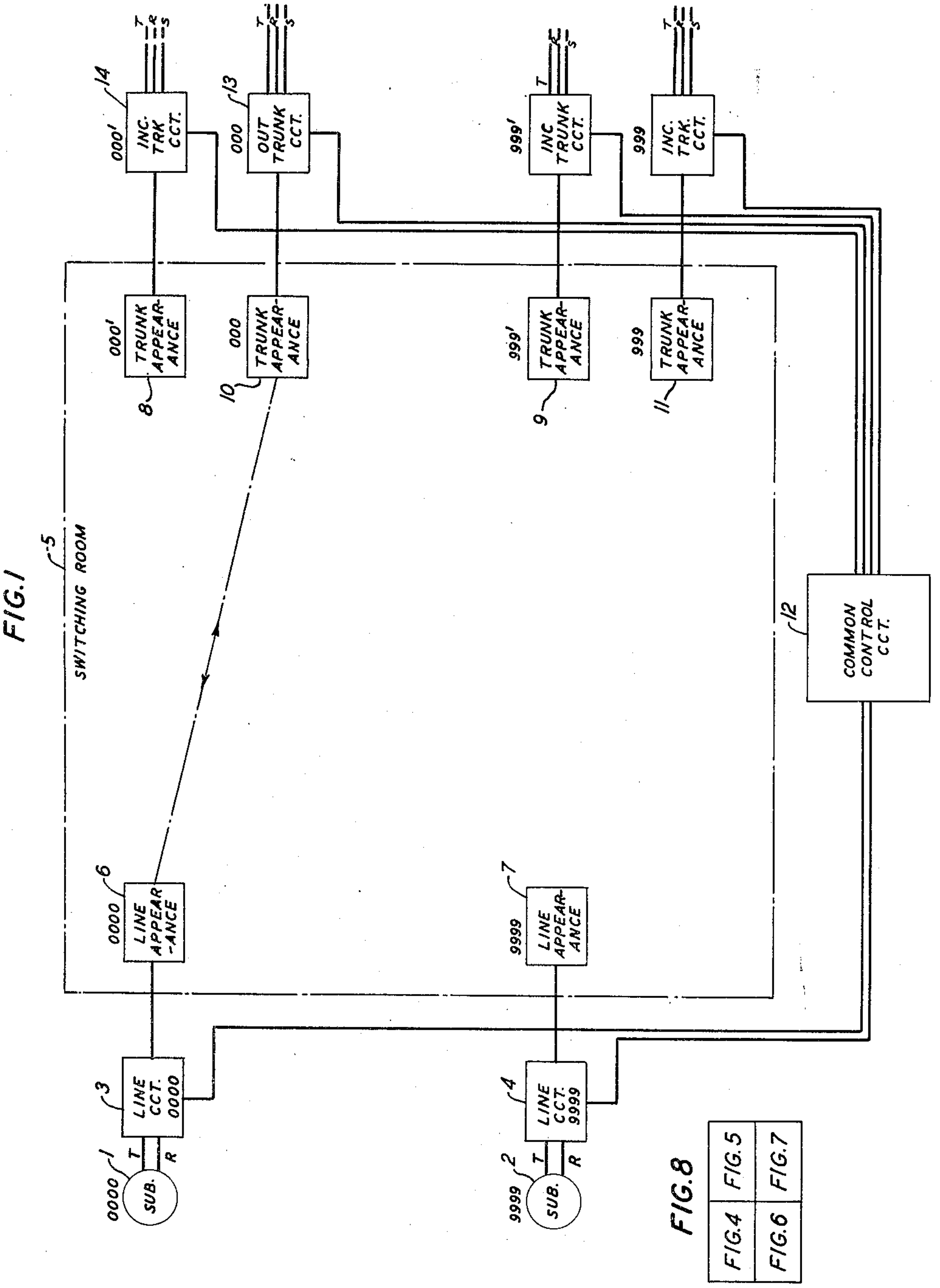
Fig. 1 is a schematic showing one switching plan and illustrating the principle of the invention.
Figure 4:
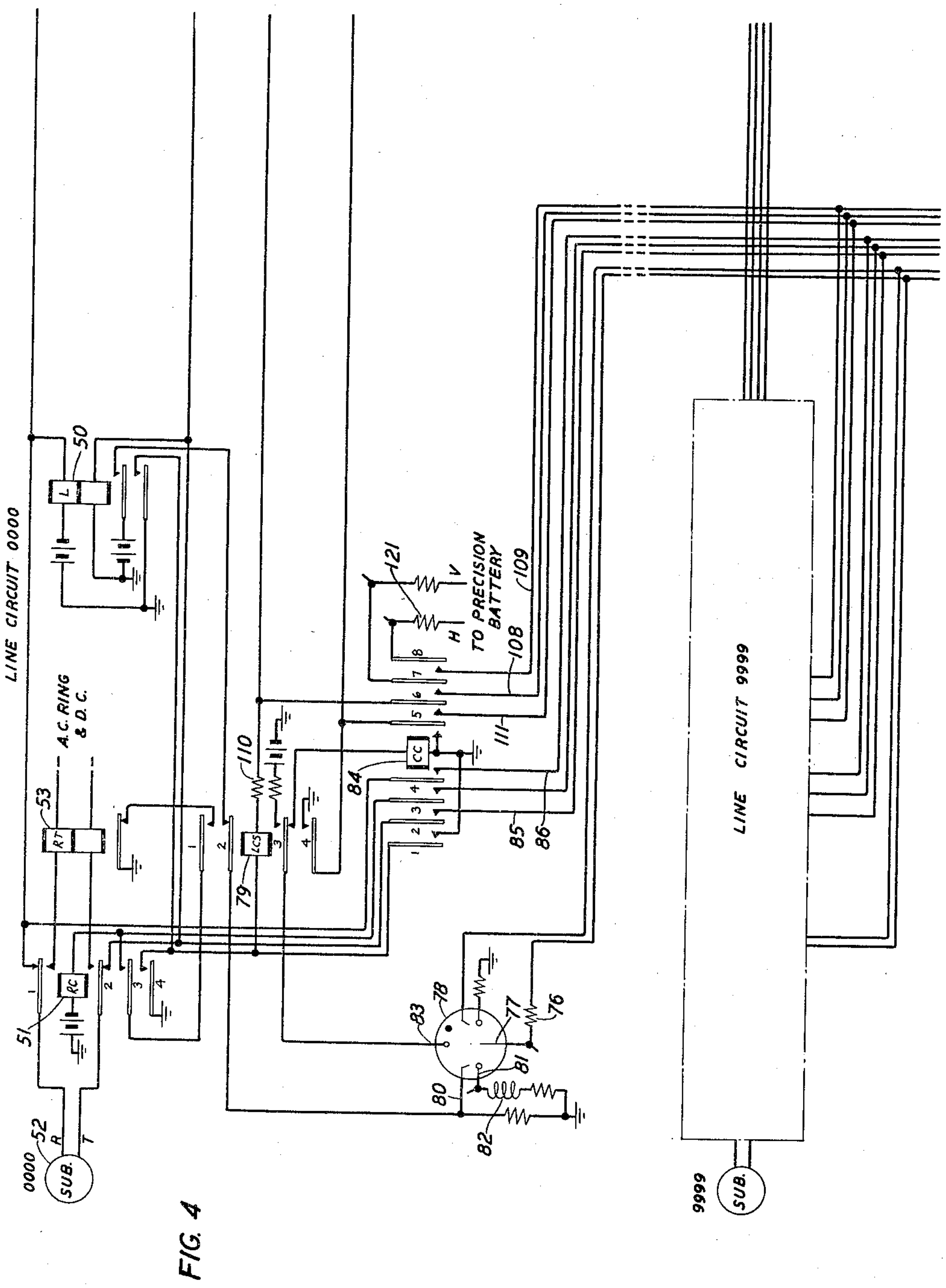
Figure 5:
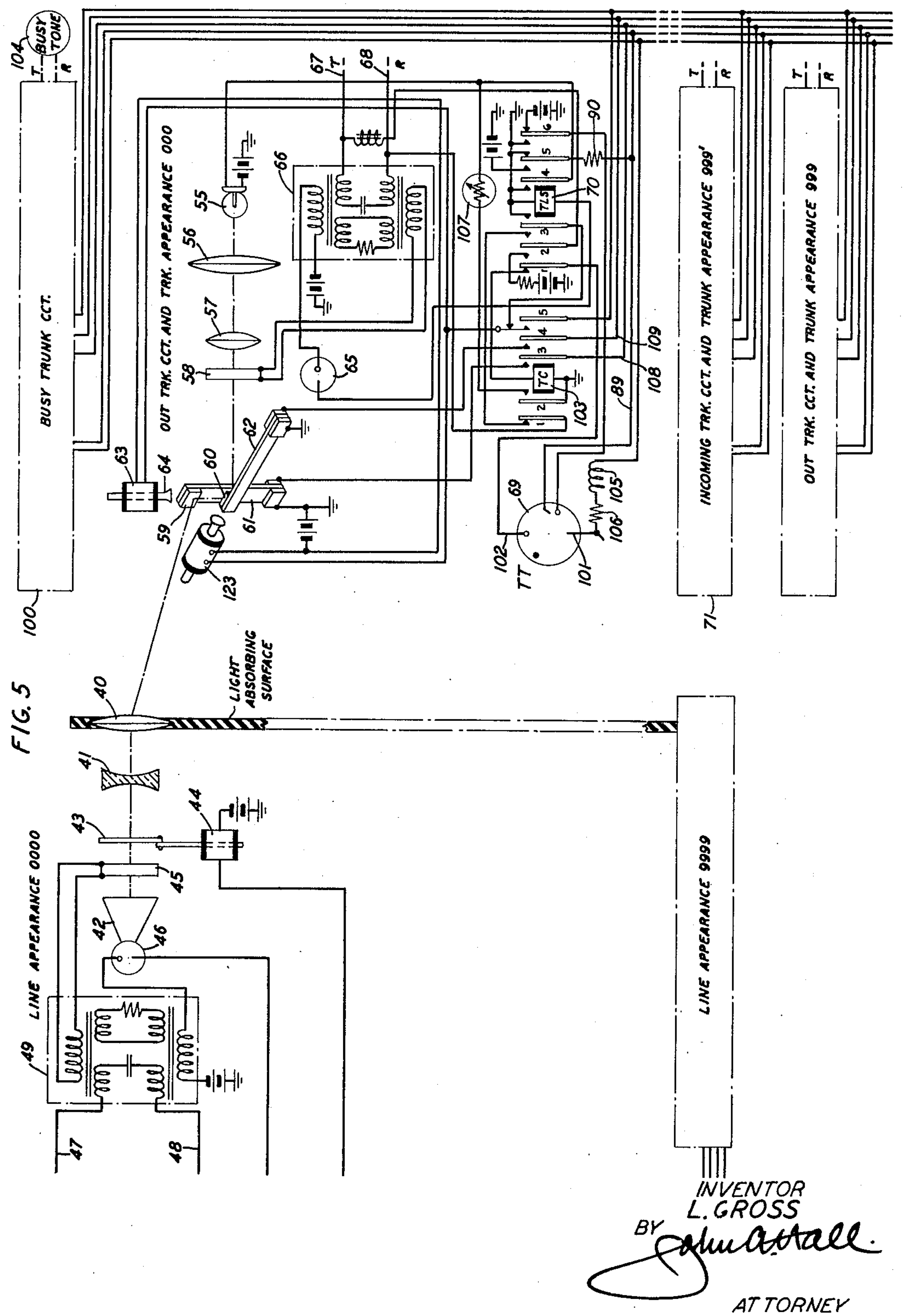
Figure 6:
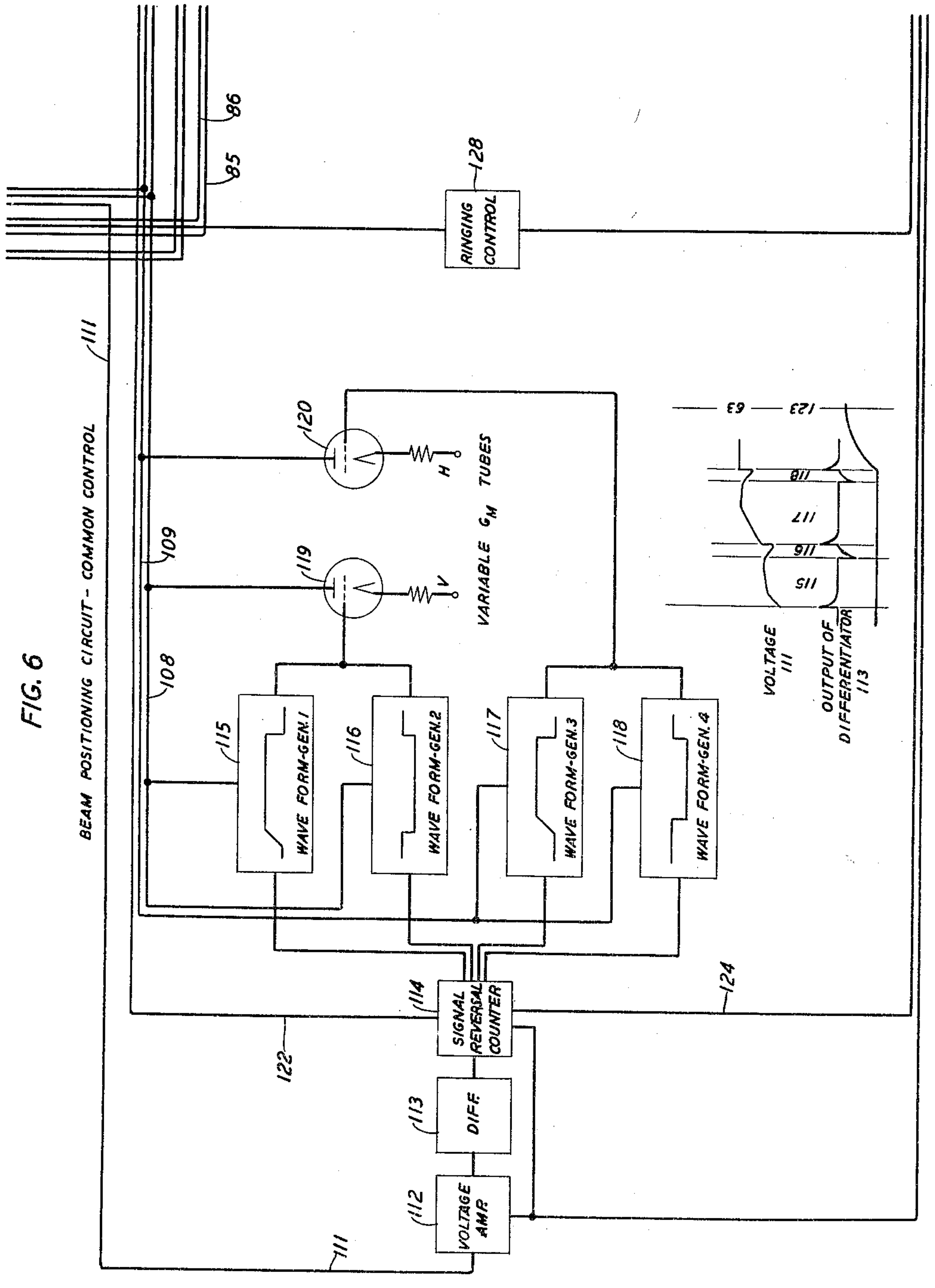
Figure 7:
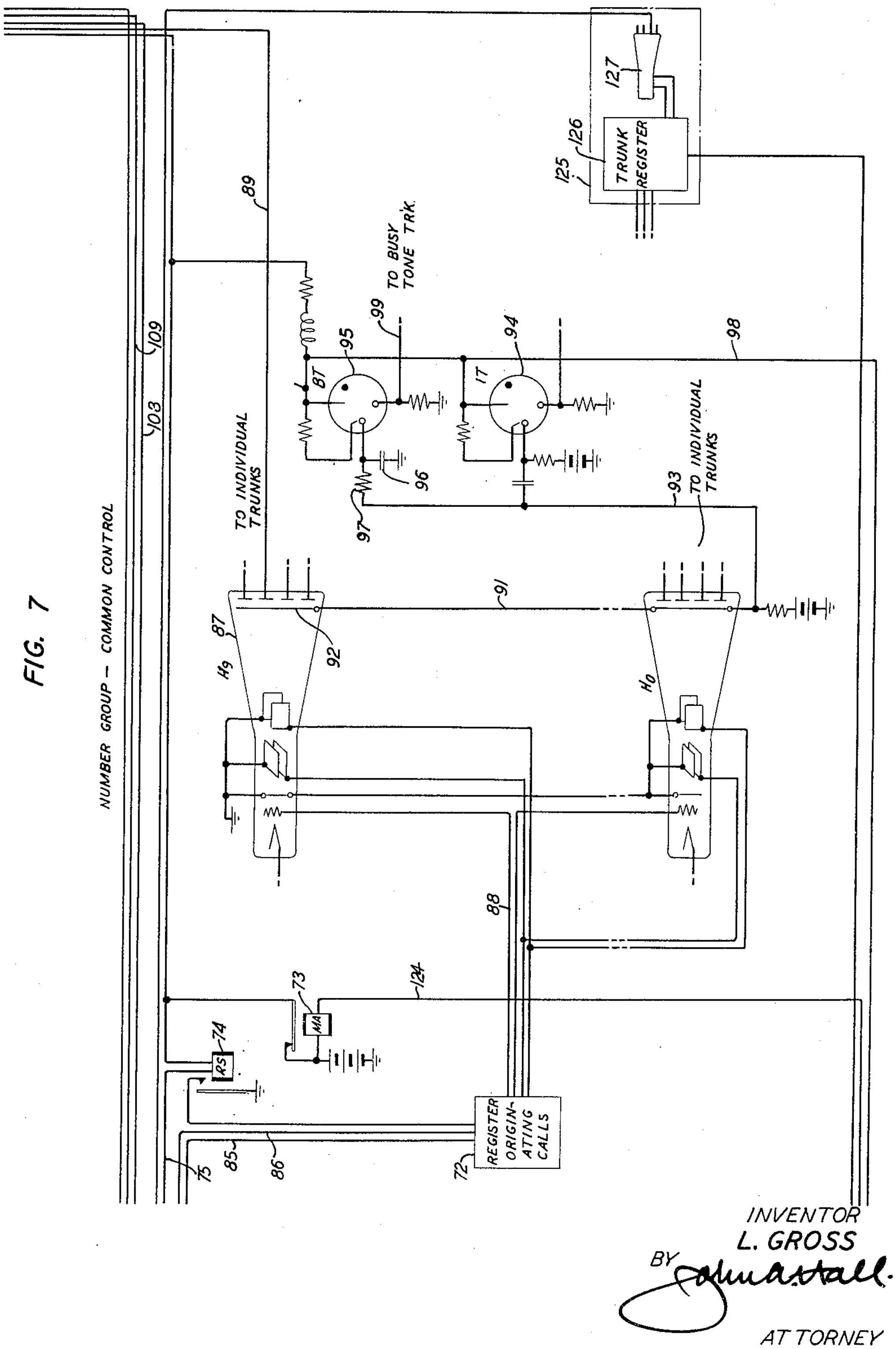

Figs. 4 to 7 arranged as shown in Fig. 8 constitute a circuit diagram showing one embodiment of the arrangement illustrated in Fig. 1 and in which Fig. 4 shows the line circuit, Fig. 5 shows the light beam terminating arrangements, Fig. 6 shows the beam positioning circuit in the common control circuit and Fig. 7 shows the number group device in the common control device; and Fig. 8 is a block diagram showing how Figs. 4 to 7 may be arranged.

The broad outline of the telecommunication switching system using light beams as part of the talking path is set forth herein. The essential parts of the switching means are a light beam, modulated and directed toward a retrodirective mirror (or corner reflector). Associated with each corner reflector is a photodetector and a modulator. This modulator impresses a signal on the reflected beam which signal is then transmitted over the beam to the distant selected point. Another photodetector mounted in close proximity to the light source detects the signals on the reflected beam. By directing one light beam toward a selected one of a plurality of retrodirective mirrors and thereby reflecting the light beam back on itself, two-way communication may be established.

Several switching plans using the light beam talking paths are herein set forth. The location of the beam directors and the light sources with respect to the retrodirective mirrors is the distinguishing feature of each of these arrangements.

(*a*) The arrangement shown in Fig. 1 is one in which each line appears in a retrodirective mirror with its various controlling devices so that a connection may be set up by a light beam directed thereto either from an incoming trunk appearance or an outgoing trunk appearance;

(*b*) The arrangement shown in Fig. 10 is one in which link circuits are used, each having an incoming an an outgoing terminal by means of which a light beam may be directed to two line appearances thereby interconnecting the two and establishing communication between them; and (*c*) The arrangement shown in Fig. 11 is another variation by means of which each line appearance has all of the elements necessary for establishing intercommunication by light beams so that a calling line may select any one of a number of other lines by directing a light beam toward the line appearance of the other as reflected by a plane mirror at the end of a switching room.

By way of example, the line appearances, that is, the retrodirective mirror and the other controlling devices may be mounted on one wall of what may be termed a switching room. The apparatus for each line would occupy about a 2-inch square so that an array of 100×100 to make a 10,000 line exchange would fill a wall 17 feet square. Trunk appearances of a lesser number, say 10 per cent of this, would be mounted on a parallel wall distant about 70 feet. These dimensions are by way of example only, and may be varied for different purposes.

In Fig. 1, two of 10,000 subscribers' stations 1 and 2 are shown. The substation 1 is numbered 0000 and the substation 2 is numbered 9999, it being understood that the other substations of this system have other numbers between these two limiting values. Each line extends from the premises of a subscriber to the central office over a two-wire line known as the tip and ring and each has its own line circuit such as the circuits 3 and 4, respectively.

The switching room 5 is shown as a large broken line rectangle. Within this switching room and at the left-hand wall thereof the line appearance 6 for the substation 1 and the line appearance 7 for the substation 2 are shown. At the other end of the room, incoming trunk appearances 8 and 9 and outgoing trunk appearances 10 and 11 are shown.

The subscriber at substation 1 may through his control of the common control circuit 12 cause a connection to be established between the line appearance 6 and the trunk appearance 10 for the outgoing trunk 13 extending to some distant point. In a similar manner a call coming in over an incoming trunk 14 may through the use of the common control circuit 12 cause a connection to be established between the trunk appearance 9 and the line appearance 7. The establishment of these connections consists essentially of the direction of a light beam from the trunk appearance either incoming or outgoing to the retrodirective mirror in the line appearance. The details of these devices are shown and explained more fully hereinafter.

Figure 2:
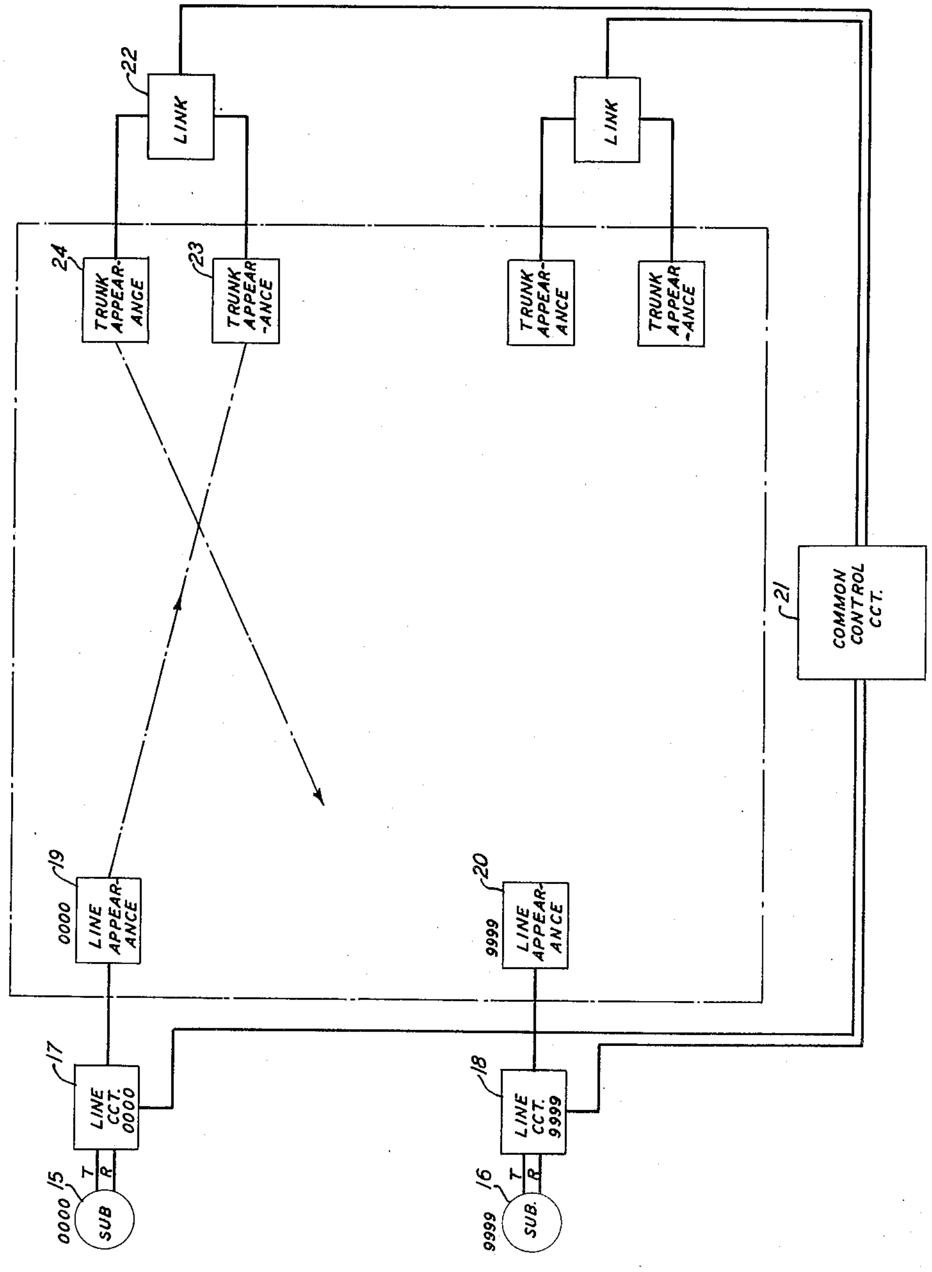
Fig. 2 is a schematic similar to that shown in Fig. 1 whereby connections are established by means of link circuits.

In Fig. 2 a somewhat similar arrangement is shown. Here the subscribers' lines 15 and 16 with their associated line circuits 17 and 18, respectively, and their associated line appearances 19 and 20, respectively, may through the use of the common control circuit 21 establish light beam connections between the various subscribers' circuits. For instance, the subscriber at substation 15 through the use of the common control circuit 21 may control the link 22 so that one light beam will be established between the trunk appearance 23 and the line appearance 19 of the calling line and another light beam between the trunk appearance 24 and a selected one of the lines to which a connection is desired, whereby communication may be established between substation 15 and the said selected substation.

Figure 3:
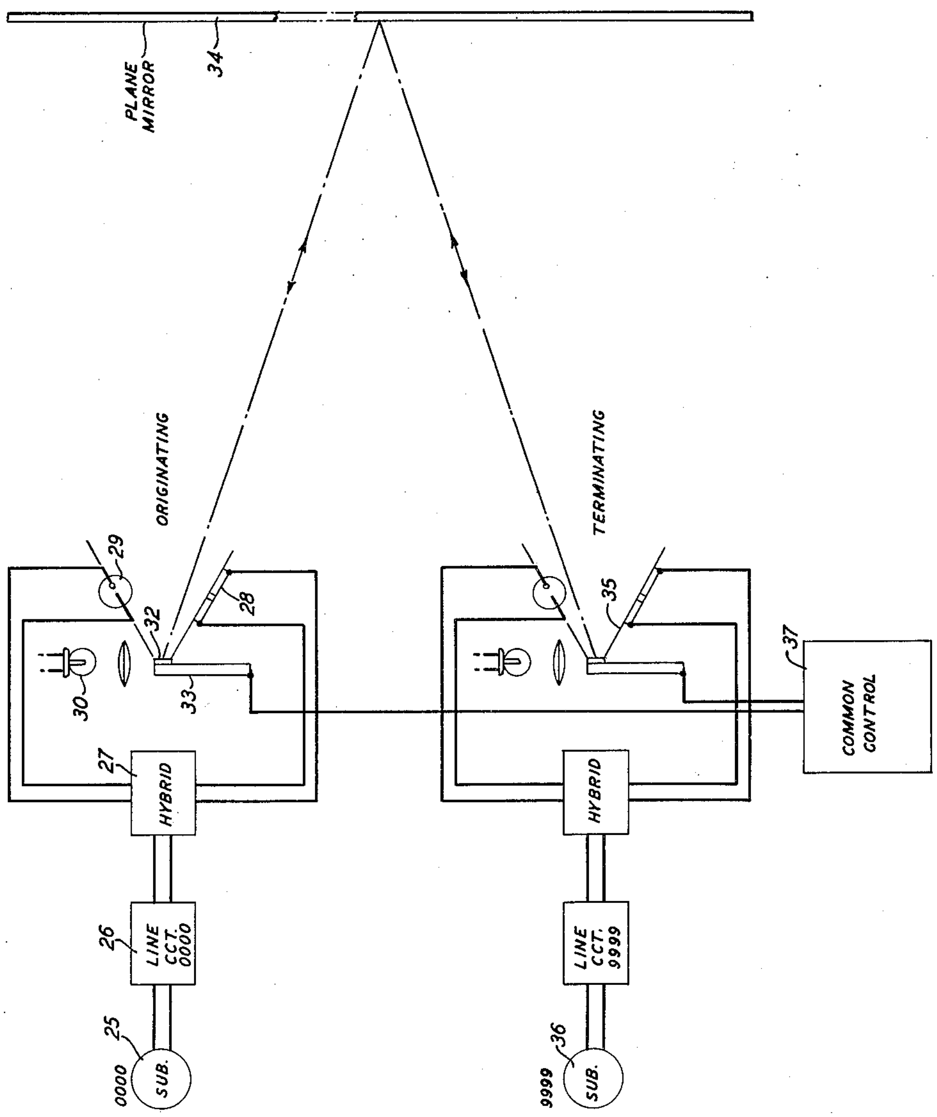
Fig. 3 is another schematic similar to that of Fig. 1 showing a plan whereby connections are set up by apparatus individual to the subscribers' lines through a light beam reflected by a plane mirror from one line appearance to another.

In Fig. 3 another general outline plan is disclosed. In this the substation 25 is connected through a line circuit 26 and thence through a hybrid coil 27 having a transmitting device 28 mounted on or associated with one of the plane surfaces of a retrodirective mirror and a receiving device 29 similarly mounted on or associated with another of the plane surfaces of the retrodirective mirror. Associated with this line appearance there is a lamp 30 shown as a source of light with a lens 31 to create a beam which will then be reflected by two mirrors such as the mirror 32 mounted on a member 33 which is capable of a small movement so that when two of these mirrors are each moved the light beam may be directed in any desired direction. In Fig. 3 such a light beam is indicated as being directed to a plane mirror 34 and reflected therefrom to the retrodirective mirror 35 associated with selected subscriber's line 36.

Each line, such as the lines 25 and 36, may through the use of the common control 37 cause the appropriate movements of the devices such as 33 to move the mirrors such as the mirror 32 to direct the light beam as desired.

In each of these devices or plans, communication from one station to another is effected through the modulation of the light beam at the originating end and the detection of the modulated light beam and the translation thereof at the other end. Many well known and conventional components can be used for these purposes.

LINE AND TRUNK APPEARANCES

A. *The line*

The line appearance shown in Fig. 5 consists of a lens system shown herein as the lens 40 and the lens 41 to collect the incident beam from a distant source and concentrate a parallel beam upon the corner reflector 42 behind it. The lenses are coated to minimize optical reflections and are of short focal length so that what little light is reflected will be widely scattered to reduce optical cross-talk. A shutter 43 operated by a solenoid 44 mounted behind the lenses operates when the line is in use and permits light to pass through the modulator 45 and fall upon the corner reflector which is here shown as having a photodetector 46 mounted at its truncated vertex. The photodetector 46 and the modulator 45 are connected to the lines 47 and 48 through a conventional hybrid coil 49, the photodetector acting as a receiver of incoming signals and the modulator acting as a transmitter of outgoing signals.

Since each line appearance is part of a two-dimensional array, the line circuit (Fig. 2) identifies its appearance by two voltages corresponding to its coordinates in the array. Whenever the line circuit is energized, this information (or the two said voltages) is used to direct a light beam upon the line appearance in question. In the absence of a metallic path between trunk and line, supervision is maintained by the presence of the light beam. The change from "dark" to "light" current operates a light current supervisory relay (LCS). This dissipates a fraction of the signal received by the photodetector but this loss may be avoided by some conventional form of trigger action circuit.

Each half of a connection in the originating and terminating offices is held up by the local substation circuit. At the termination of the connection when the line is released by the holding subscriber the shutter 43 in the line circuit is released and the shutter closed, thereby releasing the light current supervisory relay in the trunk, thereby restoring the trunk to normal. The ringing arrangements are local to each line circuit.

The connection between the line appearance in Fig. 5 and the line circuit in Fig. 4 is as follows: The lines 47 and 48 derive talking current through the windings of a line relay 50 from a source of battery and ground and extend through the back contacts of the ringing connect relay 51 to the substation line. When the subscriber thereat makes a call the line relay 50 will be operated and will establish connections which will be more fully described hereinafter.

When the substation 52 is selected to have a connection established thereto then the ring connect relay 51 will be operated and will connect the line conductors through the windings of the ringing trip relay 53 to a source of ringing current in the conventional manner. When the called subscriber answers the ringing trip relay 53 will operate and by removing a ground connection to a holding circuit of the ring connect relay 51, will allow this relay to release and establish the connection to the lines 47 and 48 and thence through the hybrid coil 49 to the various devices for establishing the connection over the light beam.

B. *The trunk*

The trunk appearance shown to the right in Fig. 5 consists of a light source 55 and a lens system consisting of the lenses 56 and 57 designed to form a parallel light beam of spot size, less than an inch in diameter at the line appearance. Due to the unavoidable divergence of a light beam the light source, real or virtual, must be small (for example, not larger in diameter than .005 inch). The light beam passes through a modulator 58 and falls on the beam directors 59 and 60. These are two mirrors mounted at right angles to each other, one rotated in azimuth and the other in altitude. Voltages applied to their deflecting elements 61 and 62 determine their angular position and the location of the light beam on the line appearance field. The deflecting elements 61 and 62 may, by way of example, be piezoelectric crystals. The beam directors may be locked in place, once deflected, by a solenoid operated clamp. Thus a solenoid 63 controls an element 64 in such manner that when the solenoid is energized the element 64 will firmly push against the end of the beam director and hold it in the position to which it has been moved by the electrical potentials applied. A photodetector 65 placed in close proximity to the modulator 58 intercepts a portion of the reflected light beam from the selected line appearance and detects the signal thereon. A hybrid coil 66 connects the modulator and photodetector to the trunk represented by the trunk conductors 67 and 68.

An idle outgoing trunk circuit is seized in a lock-out circuit by firing a trunk tube 69 through the number group as will be explained more fully hereinafter. The location voltages of the line appearance to which a connection is to be established are applied to position the beam director. A time delay is inserted so that the light beam is produced after the beam directors have come to rest and the light beam does not sweep over undesired line appearances. When the reflected beam is detected the "light" current operates the trunk supervisory relay 70 to complete the trunk circuit connection.

An incoming trunk herein indicated by the broken line rectangle 71 has those features of the line circuit used for initiating calls and is conventional except for the arrangements shown and described in connection with the outgoing trunk appearance.

THE COMMON CONTROL

The common control shown in Figs. 6 and 7 transmits positioning voltages from the line to the trunk circuit and checks to see that a connection has been established before releasing. For the sake of simplicity it may be assumed that each subscriber is provided with a preset dial arrangement which will supply the dialed digits to a register within the common control circuit at a rate fast enough to avoid the complications necessary in systems where the holding time of the common control necessitates a plurality of common control devices and the allotting means therefor. The register herein shown in the rectangle 72 upon receiving the signals identifying the called line consults a number group device which tests for a busy or idle condition. At the completion of this test the common control has been connected to a trunk and the vertical and horizontal voltages are applied to the beam directors of that trunk. The beam is accurately centered upon the retrodirective mirror in the line appearance by the beam positioning circuit. The common control then sends a clamping signal to the trunk to hold the beam directors locked in place. The common control then retires.

NUMBER GROUP

The device shown in Fig. 7 is an arrangement whereby digits transmitted by a calling line and registered in the register 72 may be used to select a trunk characterized by a three-digit number, as by way of example, one leading to a particular exchange characterized by such three-digit number. The said number group consists essentially of a means to reach out to select a trunk or some other facility characterized by the registered number.

BEAM POSITIONING CIRCUIT

When an idle circuit, whether it be a desired trunk, line or busy tone trunk, has been selected, then the beam positioning circuit of Fig. 6 comes into operation and centers the beam produced and controlled by the selected circuit on the retrodirective mirror of the calling line. A series of signals applied to the V (vertical) and H (horizontal) tubes causes them to pass current through the V and H resistors in the line array multiple thus controlling the deflecting voltages by means of the IR drop. At the end of its cycle of operation, the beam positioning circuit applies a clamping voltage to the beam directors, thus completing the duties of the common control.

FUNDAMENTAL OPERATION IN ESTABLISHING A CONNECTION

A calling line or trunk seizes a common control and then transmits into a register therein an identification of the called line or trunk. The common control then causes the line or trunk appearance which has the beam establishing means to establish a beam and to then direct it to the other appearance which supplies the identifying beam directing voltages, the common control acting to modify such voltages sufficiently to accurately position the beam.

The various line and trunk appearances are in groups and the appearance in each group is in what is termed a lockout relation to the others so that only one at a time may be served by the common control. The lock-out circuit, fundamentally, is disclosed in Patent 2,326,551, granted August 10, 1943, to M. E. Mohr.

Let us now trace the operations in the establishment of a connection from substation 52 to the outgoing trunk circuit over conductors 67 and 68. The subscriber in initiating a call establishes a conventional substation network through which sufficient current will flow to operate the line relay 50. When the common control is free, positive battery will be connected through the back contact of the main anode relay 73, through the winding of RS relay 74, conductor 75, resistor 76 to the main anode 77, of tube 78. The operation of relay 50 has connected positive battery potential over the back contact and armature 2 of the LCS relay 79 to the start gap anode 80 of the tube 78. If the potential of the start gap cathode 81, connected in common with other tubes in this group to the inductance 82 has not been raised too high by reason of the busy condition of another tube of the group then the tube will be fired at this start gap. Assuming that the common control is free as stated and that, therefore, the positive potential from the battery at relay 72 is connected to the main anode 77, the firing of the tube at the start gap will now transfer to the main gap so that current will flow from the positive battery over the main anode 77 to the main cathode 83 through the armature 3 and back contact of the LCS relay 79, the winding of the CC relay 84 to ground. Relay 84 is employed for effectively connecting the line circuit to the common control for an instant during which the number of the called line is transmitted to the register, the beam established at a selected outgoing trunk appearance and the beam positioned by the common control circuit. A connection from the tip of the line is made over armature 2 and back contact of the RC relay 51, armature 2 and front contact of the CC relay 84, the tip wire 85 to the register 72. A connection from the ring conductor of the line is similarly made over armature 1 and back contact of the RC relay 51, armature 4 and front contact of the CC relay 84, ring conductor 86 to the register 72.

The register 72 is conventional and will respond to signals sent from the substation 52 to register at least a portion of the identification of the called line. In the present case, the register 72 is shown as a means for controlling an electronic number group and an electronic busy and idle test means. These are shown in Fig. 7.

When the tube 78 has fired then the main anode current through the winding of relay 74 will operate this relay and will enable the register 72. When the information stored on the preset dial at the substation 52 is transmitted to the register then this register will pick out one of a number of cathode-ray tubes such, for instance, as the H9 tube 87 through the electrical selection of the individual grid wire 88. The cathode-ray produced in this tube is now directed to a particular one of one hundred dynodes, let us say that one connected to the individual wire 89 leading to the correspondingly numbered trunk in Fig. 5.

The normal connections to the trunk tube 69 are as follows. The start cathode of this tube is connected through armature 6 and back contact of the TLS relay 70 to a source of negative potential (−70 volts). The start anode of this tube is connected through the armature 5 and back contact of the TLS relay 70 to ground potential through a resistor 90. This start anode is also connected to the wire 89 from the cathode-ray tube. Let us assume that the potential of a battery connected to the secondary collector grids of the cathode-ray tubes by conductor 91 is +100 volts. Therefore, when the cathode-ray is directed to the dynode connected to conductor 89 and the trunk with which the trunk tube 69 is associated is idle the effective connection made between the dynode and the secondary collector grid 92 will cause a current to flow between the +100-volt battery and the ground potential at the back contact of armature 5 of the TLS relay 70. Due to the resistor 90 the change in potential at the start anode of the tube 69 is, by way of example, from ground to say +30 volts. The corresponding change of potential on conductor 91 from +100 volts to +30 volts, therefore, constitutes what may be termed a strong pulse (change of 70 volts) on conductor 93. Conductor 93 is connected in parallel to the two tubes 94 and 95 in such a manner that the tube 94 will immediately respond to a large pulse such as that now described. This tube therefore fires and through the lock-out connection between the main anodes of the tubes 94 and 95 prevents the tube 95 from responding. Due to the connection of the condenser 96 and the resistance 97 the tube 95 is somewhat slow to respond so that before it can respond to this large pulse on conductor 93 it is locked out through the operation of the tube 94. Thus, if the trunk selected is idle the tube 94 will be fired and the tube 95 will remain locked out. Due to the firing of tube 94 the conductor 98 will be affected to enable the beam positioning circuit.

Let us now assume that the trunk is busy and that, therefore, the TLS relay 70 is operated. In this case the start cathode of the trunk tube 69 is grounded (zero potential) by armature 6 and the start anode is held at a positive potential (+50 volts, for example). Therefore, when the register 72 has been set and the cathode-ray directed to the dynode connected to conductor 89 the result will be a small pulse on conductor 93, for the connection of 50 volts through the resistor 90 to the conductor 91 will produce only a small change in potential as compared with that produced in the previous case. The tube 94 will not respond to such a small pulse but the tube 95 will do this in time. Therefore, the tube 95 will fire and in the same manner will lock out the tube 94. The tube 95 will now affect a conductor 99 which may be used to fire the trunk tube of the busy test circuit 100, which will thereupon establish a beam and point it toward the line appearance of the calling line to transmit a busy tone thereto.

The number group controlled by the register 72 will attempt to seize the called trunk and will report the busy or idle condition thereof in the manner stated. The operation of the trunk tube 69 is as follows. The start cathode at this tube is connected to a negative potential when the TLS relay is normal and the start anode is raised from ground potential to, say +30 volts when the dynode connected to conductor 89 is selected by the cathode ray. If the trunk is thus idle then a current flow will be established between the main anode 101 and the main cathode 102 of the tube 69. However, if the trunk is busy, then the potential of the main cathode will have been raised to the point where no current flow will be established from the main anode to the main cathode and thence the tube 69 will not fire.

Assuming that the trunk is idle then the firing of tube 69 will establish a circuit through which current will flow from positive battery, the back contact and armature of the main anode relay 73, the main anode 101, the main cathode 102 through the armature 1 and back contact of the TLS relay 70, the winding of the TC relay 103 to ground.

In case this trunk were busy such condition would be denoted by the operation of the TLS relay 70 so that the cathode 102 instead of being connected through armature 1 of the TLS relay to a ground connection as just described would instead be connected to a positive battery connection so that the gap will not break down. The busy tone circuit will then be appropriated in the manner stated. This circuit will then establish a beam and position it in the same manner that the beam from the circuit shown in detail is positioned and which will be described shortly. In such a busy back trunk the tip and ring line conductors similar to the conductors 67 and 68 will in this case extend to a source of busy tone 104.

Let it be assumed that the outgoing trunk circuit shown in detail in Fig. 5 is idle. Therefore, when the trunk tube 69 fires, a circuit will be established from the main anode 101 through the main cathode 102, the armature 1 and back contact of the TLS relay 70 to the winding of the TC relay 103 which thereupon operates. During the short interval over which this circuit is established the presence of the common inductance 105 and the resistance 106 in the circuit of the main anode acts to depress the potential on the anodes of other tubes connected in parallel therewith and to, therefore, effectively lock out any other tube than the one now in operation.

The trunk connector relay 103 in operating extends ground through its armature 2 and front contact through the thermistor 107 to the lamp 55 representing a source of light to establish the beam. The thermistor 107 is a device which initially has high resistance but which due to the current flow and the consequent heating thereof will lower its resistance. Therefore, the lamp 55 will not come up to full brilliance immediately thereby avoiding the sweeping of a light beam over other line appearances during its establishment and positioning.

The trunk connector relay 103 also connects through its front contacts and armatures 3 and 4, the two beam positioning devices 62 and 61, respectively, and thence over the conductors 108 and 109 to the beam positioning circuit in Fig. 6. At the same time the control connector relay 84 in Fig. 4 has connected taps for the horizontal and vertical voltages to the conductors 108 and 109. The taps for supplying these voltages are shown as coming from a precision battery which means that they are connected to predetermined voltage points supplied by a battery which is maintained very precisely.

It may be noted at this point that the beam which is established at each trunk appearance will be positioned accurately at the center of the field when both of the beam positioning devices are in their normally unoperated positions. Therefore, the beam may be moved horizontally to any one of fifty positions toward the right or alternatively to any one of the fifty positions toward the left. Similarly, the beam may be moved by the other beam director to any one of fifty positions above or alternatively to any one of fifty positions below its normal position. Each line circuit, therefore, is connected to a pair of precision battery leads of the proper polarity and magnitude to move the beam of a distant trunk appearance to the line appearance associated therewith.

Due to the change of potential of the conductor 98 and the application of the precision battery voltages to conductors 108 and 109 the beam will be directed toward the line appearance as indicated in Fig. 5 even though the beam may not yet be established in all of its brilliance.

The beam positioning circuit of Fig. 6 is a means for accurately centering the beam which is transmitted from the trunk appearance on the line appearance in Fig. 3. As the beam strikes the line appearance then the photodetector 46 becomes active and the current flow therethrough and thence through the resistance 110, the winding of the LCS relay 79, through the front contact and armature 2 of the line relay 50 to ground increases. The lead connected to the armature 6 and front contact of the CC relay 84 and thence over conductor 111 therefore carries a potential measured by the IR drop which is the product of the current flowing in the photodetector 46 and the resistance of the LCS relay 79 and the resistor 110. Therefore, as the beam becomes established the voltage on conductor 111 rises.

The device represented by the rectangle 112 is a voltage amplifier which may be in the form of a conventional vacuum tube voltmeter. This, when it is enabled by conductor 98 communicates the voltage changes in the conductor 111 to the differentiator 113. This is a device consisting essentially of a small condenser and a resistance which upon the application of a voltage thereto will produce a positive signal in the form of a positive impulse of short duration. As the beam is moved to the photodetector 46 it is intentionally moved too far so that the voltage applied to the differentiator 113 will rise and then start to decrease. In other words, the voltage of the precision battery connected to conductor 108 is made slightly higher than is actually necessary so that as the beam is being centered the voltage on conductor 111 rises and then begins to decrease. As soon as the voltage reaches its peak value and begins to decrease the differentiator 113 generates a negative signal. These positive and negative signals are transmitted by the differentiator to the signal reversal counter 114 to sequentially energize the wave form generators 115, 116, 117 and 118. The generators 115 and 116 control the tube 119 and the generators 117 and 118 control the tube 120. These tubes are known as variable $g_m$ tubes and each responds to the potential applied to its grid to cause a larger or smaller amount of current to flow in its anode-cathode circuit. The anode of tube 119 is connected to conductor 108 and, therefore, as the current increases the drop in the resistor 121 increases so that the potential of the conductor 108 therefore somewhat decreases. Hence, when the rising voltage of conductor 111 is communicated to the wave form generator 115 it causes the potential of the grid of the tube 119 to rise accordingly. Hence, the potential of conductor 108 is again somewhat reduced so that now the beam as controlled by the element 62 which was swept almost past the center point of the line appearance is now brought back and swept in the opposite direction a very short distance past the center point. As the potential on conductor 111, therefore, starts to decrease the differentiator 113 sends a negative impulse which operates the signal reversal counter 114 to transfer from the wave form generator 115 to the wave form generator 116 and this now reduces the potential on the grid of the tube 119 by a small definite amount whereby the potential of conductor 108 through the smaller amount of current flowing through resistor 121 is allowed to rise a smaller and definite amount to exactly center the beam on the line appearance retrodirective mirror 42. The change from a falling potential on conductor 111 to a rising potential now causes the differentiator 113 to operate to send another pulse which now enables the wave form generator 117 so that in this same manner the beam as controlled by the element 61 is centered in the horizontal direction.

The differentiator is a device known as an RC peaker and a description of such a device may be found in the "Principles of Radar," a publication of the Technology Press, Massachusetts Institute of Technology, published by the McGraw-Hill Book Company, Incorporated, 1946, pages 2–17 et seq. Reference may also be made in the volume to pages 3–12 et seq. under "Sweep-Voltage Circuits" and particularly to pages 3–20 under "Sweep Integrating Circuits" where means to insure a constant potential at the end of a sweep may be incorporated in the differentiator 113.

The signal reversal counter is a conventional chain of counting tubes which responds to the positive and negative pulses generated and transmitted by the differentiator 113. A reference to a device of this nature may be found in a volume entitled "Time Bases" by O. S. Puckle, published at New York by John Wiley and Sons, Incorporated. Schmitt's trigger circuit, pages 57 et seq., is a device which will operate in the desired manner.

Thus, as the beam is established it is automatically centered by means of the beam positioning circuit (Fig. 6). When the vertical director 62 and the horizontal director 61 have adjusted the beam so that the maximum effect in the photodetector 46 is achieved then the signal reversal counter 114 connects ground to the conductor 122 which is transmitted through the armature 5 and front contact of the TC relay 103 to operate the clamp magnets 63 and 123. These clamp magnets thereupon secure the mirrors 59 and 60 in the positions to which they have been moved so that upon the break in communication between the precision battery connected to the armatures 7 and 8 of the CC relay 84 and the beam directors 61 and 62 the mirrors 59 and 60 will be maintained in position.

In the lower part of Fig. 6 the action described has been pictured in the form of several graphs plotted against time. The graph of voltage —111 is shown as beginning from the time that the voltage on the conductor 111 becomes effective. At this instant the differentiator 113 produces a positive pulse and thereafter the generator 115 is in operation. When the voltage then begins to diminish a negative pulse is generated and the generator 116 becomes effective. The response of the generator 116 follows very quickly and boosts the voltage of the conductor 111 upwardly again whereupon another positive pulse is produced by the differentiator 113. This action is followed as pictured until the maximum voltage is achieved which means the maximum light is being received by the photodetector 46. The lowermost graph shows that upon the last positive pulse produced by the differentiator 113 the conductor 122 is grounded which results somewhat later in the operation of the clamping magnets 63 and 123. The signal reversal counter 114 also at this time grounds the conductor 124 to operate the main anode relay 73 and thus disconnect the main anode potential from the conductor 75. This will also release the RS relay 74 so that the ground applied to the register for enabling it and for enabling the number group is removed thus returning these devices to normal.

In connection with these graphs it need be noted at the present that the rise of voltage in the conductor 111 is accompanied by the rise of current in the LCS relay winding 79, so that this relay responds and by operating its armature 3 opens the circuit for the CC relay 84. However, and the point to be mentioned here is that, the action of the beam positioning circuit shown in Fig. 4 takes place in a matter of a few microseconds, whereas it takes the relay 79 and thereafter the relay 84 a number of milliseconds to operate so that the impulse to operate the relay 79 and to release the relay 84 is coincident with but far longer in point of time than the operation of the beam positioning circuit.

After the beam has been properly positioned and has come to full brilliance then the reflection of that beam from the retrodirective mirror 42 will extend back to the trunk appearance and will affect the photodetector 65. This increases the current flow therein which may be traced from battery through a coil of the hybrid coil 66, the photodetector 65, the winding of the TLS relay 70 to ground. When no light strikes the photodetector 65 the current flow through the relay 70 is insufficient to cause the operation of this relay but as soon as the light beam is established the photodetector 65 is energized and the increase of current in the relay 70 is sufficient to cause its energization.

Through its armature 4 and front contact the TLS relay 70 establishes a direct connection to the lamp 55 to hold this at full brilliance independent of the thermistor 107 during the use of the trunk.

Upon the operation of the TLS relay 70 the TC relay 103 is deenergized and therefore releases. As the beam comes to full brilliance and the photodetector 46 passes more current the relay 79 operates and releases the CC relay 84 as described. Relay 79 connects a source of positive battery to the main cathode of the line tube 78 so as to render this tube incapable of firing if a connection should be directed to it while the line 52 is in use. Ground is connected through the front contact and armature 4 of the LCS relay 79 to maintain the shutter 43 opened during the use of the established connection.

When the subscriber station 52 relinquishes the connection the line relay 50 will become deenergized whereupon the LCS relay will release and in releasing will release the shutter magnet 44 so that light from the distant beam will be shut off and the reflected beam will be interrupted and no signal is returned to the photodetector 65. The current through photodetector 65 reduces to the point where the TLS relay 70 releases and lamp 55 is extinguished. Thus the connection is released.

Means for establishing a connection to the line are very roughly indicated. A broken line rectangle 125 in Fig. 7 shows a trunk register 126 which may be set by signals sent over an incoming trunk to operate a number group device 127. This number group 127 shows a conductor leading therefrom to the line tube 78 so that the tube may be fired in a similar manner to that described in connection with the trunk tube 69. If the start gap fires, and the line is idle, then an electron stream will be established between the main anode 77 and the main cathode 83 and during the operation of this tube lock-out will be provided by the resistance 76. The current then flowing through this circuit operates the CC relay 84 and through the agency of a ringing control circuit 128 the RC relay 51 is operated. This locks into operation through the back contact of the ringing trip relay 52 so that the common control may be dismissed as soon as the beam from the incoming trunk appearance to the line has been established. As soon as the CC relay 84 is operated then the precision battery terminals characterizing this particular line will be connected to the conductors 108 and 109 to position the beam in the same manner as that hereinbefore described. It should be noted that in all cases the operation of the connecting relays such as the relay 84 and the relay 99 occupy a very small interval since the operation of the register of the number group and the beam positioning circuit is very rapid.

The ringing control relay is now in operation and this may operate over a comparatively great length of time. When the subscriber at station 52 answers, then the ringing trip relay 52 responds and this releases the RC relay 51. Immediately thereupon the line relay 50 is operated to hold the connection in the manner hereinbefore described.

Should the called subscriber at substation 52 fail to respond, then the release of the connection over the incoming trunk by the release of a supervisory relay in that circuit will cut off the beam and thus release the LCS relay 79. The LCS relay will open the holding circuit for the RC relay 51 and thus release the connection.

What is claimed is:

1. In a beam switching system, a cathode-ray tube having beam establishing and beam directing means, a plurality of dynodes and a common secondary emission collector grid, a plurality of lines each appearing in a dynode of said cathode-ray tube, and a circuit connected to said common collector grid comprising electronic tube means selectively responsive to an altered potential created therein when a dynode to which a beam is directed is connected to a busy line for transmitting a busy signal.

2. In a beam switching system, a cathode-ray tube having beam establishing and beam directing means, a plurality of dynodes and a common secondary emission collector grid, a plurality of lines each appearing in a dynode of said cathode-ray tube, and a circuit connected to said common collector grid comprising electronic tube means responsive to a given potential created therein when a dynode to which a beam is directed is connected to a busy line for transmitting a busy signal, and differently responsive to an altered potential created therein when a dynode to which a beam is directed is connected to an idle line for transmitting a signal indicating the said line as idle.

3. In a beam switching system, a cathode-ray tube having beam establishing and beam directing means, a plurality of dynodes and a common secondary emission collector grid, a plurality of lines each appearing in a dynode of said cathode-ray tube and a circuit connected to said common collector grid comprising a pair of electron tubes, one of said tubes being responsive to both weak and strong signals but being connected in a delay circuit for delaying its operation and the other of said tubes being responsive only to strong signals, said tubes being in a mutually controlling circuit whereby the operation of one will lock out and prevent the operation of the other.

4. In a beam switching system, a cathode-ray tube having beam establishing and beam directing means, a plurality of dynodes and a common secondary emission collector grid, a plurality of lines each appearing in a dynode of said cathode-ray tube and a circuit connected to said common collector grid comprising a pair of electron tubes, one of said tubes being responsive to both weak and strong signals but being connected in a delay circuit for delaying its operation and the other of said tubes being responsive only to strong signals, said tubes being in a mutually controlling circuit whereby the operation of one will lock out and prevent the operation of the other, for testing the idle or busy condition of the lines connected to said dynodes.

5. In a beam switching system, a cathode-ray tube having beam establishing and beam directing means, a plurality of dynodes and a common secondary emission collector grid, a plurality of lines each appearing in a dynode of said cathode-ray tube and a circuit connected to said common collector grid comprising a pair of cold cathode tubes, one of said tubes being responsive to both weak and strong signals but being connected in a delay circuit for delaying its operation and the other of said tubes being responsive only to strong signals, said tubes being in a mutually controlling circuit whereby the operation of one will lock out and prevent the operation of the other, for testing the idle or busy condition of the lines connected to said dynodes.

6. In a beam switching system, a plurality of lines, a cathode-ray tube having beam establishing and beam directing dynodes each connected to one of said lines and a common secondary emission collector grid, each said line affecting its said individual dynode in said cathode-ray tube differently in accordance with its busy or idle condition, an electron tube circuit connected to said secondary emission collector grid circuit selectively responsive to the said busy or idle condition found on any dynode to which the beam of said cathode-ray tube may be directed, a number group device controllable by a calling line for controlling said cathode-ray tube to direct its beam to the dynode of a called line, means under control of each said line for temporarily appropriating said number group means, and for establishing therethrough a connection to a called line, and means responsive to said electron tube circuit to transmit a busy signal to a calling line or alternatively to establish a connection to said called line.

7. In a beam switching system, a plurality of lines, a cathode-ray tube having beam establishing and beam directing dynodes each connected to one of said lines and a common secondary emission collector grid, each said line affecting its said individual dynode in said cathode-ray tube differently in accordance with its busy or idle condition, an electron tube circuit connected to said secondary emission collector grid circuit selectively responsive to the said busy or idle condition found on any dynode to which the beam of said cathode-ray tube may be directed, a number group device controllable by a calling line for controlling said cathode-ray tube to direct its beam to the dynode of a called line, said number group device consisting of a plurality of cathode-ray tubes for translating an indication transmitted from a calling line into a control condition for said first cathode-ray tube for selectively operating the said beam directing means thereof, means under control of each said line for temporarily appropriating said number group means, and for establishing therethrough a connection to a called line, and means responsive to said electron tube circuit to transmit a busy signal to the said calling line or alternatively to establish a connection to said called line.

8. In a beam switching system, a plurality of lines each terminating in a beam terminating means for establishing a signal circuit to other of said lines, each said line having an individual line circuit responsive to said subscriber control, common control means responsive to said line circuits, said common control means including a number group device for translating signals sent from a calling one of said lines into control signals for selecting one of said lines as a called line, a cathode-ray tube responsive to said number group device having beam establishing and beam directing means, a plurality of dynodes each connected to one of said lines, and a common secondary emission collector grid, each said line circuit having means for characterizing the dynode to which it is connected as either busy or idle, a responsive circuit connected to said secondary collector grid for testing the busy or idle condition of a selected line, and means responsive thereto for transmitting a busy signal to said calling line or alternatively for establishing a connection to said called line.

LEO GROSS.

REFERENCES CITED

The following references are of record in the file of this patent:

FOREIGN PATENTS

| Number | Country | Date |
|---|---|---|
| 567,451 | Great Britain | Feb. 14, 1945 |